United States Patent [19]

Willson et al.

[11] Patent Number: 5,983,318
[45] Date of Patent: Nov. 9, 1999

[54] MAXIMIZING HIT RATIO IN AN AUTOMATED STORAGE LIBRARY

[75] Inventors: Lee Douglas Willson; Daniel James Winarski, both of Tucson, Ariz.

[73] Assignee: International Business Machines Corporation, Armonk, N.Y.

[21] Appl. No.: 08/314,574

[22] Filed: Sep. 28, 1994

Related U.S. Application Data

[63] Continuation of application No. 07/757,797, Sep. 11, 1991.

[51] Int. Cl.$^6$ ....................................................... G06F 12/08
[52] U.S. Cl. ........................... 711/113; 711/118; 711/133; 369/34
[58] Field of Search .................................... 395/425, 600; 369/30, 34, 178; 711/113, 118, 133, 159; 707/205

[56] References Cited

U.S. PATENT DOCUMENTS

| | | | |
|---|---|---|---|
| 4,271,489 | 6/1981 | Siryj et al. ................................. | 369/38 |
| 4,310,883 | 1/1982 | Clifton et al. ........................... | 395/600 |
| 4,527,262 | 7/1985 | Manto ....................................... | 369/33 |
| 4,542,458 | 9/1985 | Kitajima et al. .............. | 364/DIG. 1 X |
| 4,614,474 | 9/1986 | Sudo ....................................... | 414/281 |
| 4,654,727 | 3/1987 | Blum et al. .............................. | 360/71 |
| 4,766,581 | 8/1988 | Korn et al. ................................ | 369/30 |
| 4,771,375 | 9/1988 | Beglin et al. ........................... | 395/425 |
| 4,864,438 | 9/1989 | Munro ...................................... | 360/92 |
| 4,864,511 | 9/1989 | Moy et al. .............................. | 364/478 |
| 4,876,662 | 10/1989 | Pence ..................................... | 364/900 |
| 4,974,156 | 11/1990 | Harding et al. .......................... | 395/425 |
| 4,987,533 | 1/1991 | Clark et al. .............................. | 395/425 |
| 5,014,197 | 5/1991 | Wolf .............................. | 364/DIG. 1 X |
| 5,131,087 | 7/1992 | Warr ........................................ | 395/425 |
| 5,142,670 | 8/1992 | Stone et al. ............................. | 395/425 |
| 5,197,055 | 3/1993 | Harting et al. ...................... | 395/425 X |
| 5,235,695 | 8/1993 | Pence ..................................... | 395/425 |
| 5,278,970 | 1/1994 | Pence ..................................... | 395/425 |
| 5,333,311 | 7/1994 | Whipple, II ............................. | 395/600 |

FOREIGN PATENT DOCUMENTS

| | | | |
|---|---|---|---|
| 2184267 | 6/1987 | European Pat. Off. ........ | G06F 12/02 |
| 0340942 | 11/1989 | European Pat. Off. ........ | G06F 12/08 |

*Primary Examiner*—Paul V. Kulik
*Attorney, Agent, or Firm*—Robert Sullivan; Holland & Hart llp

[57] ABSTRACT

The hit ratio in an automated storage library is maximized by tracking the frequency of usage of each file and rewriteable storage medium therein. For each file therein, the library counts the number of times such files are accessed. For each storage medium therein, the library counts the number of mounts thereof. Periodically, the usage statistics are reviewed to determine the most frequently used files and storage media in the library. The most frequently used files are then transferred to the most frequently used storage media, which then become still more frequently used. The less frequently used files are transferred to the less frequently used storage media, which become still less frequently used. By definition, the most frequently used storage media are the most likely to be mounted, thereby increasing the hit ratio.

7 Claims, 7 Drawing Sheets

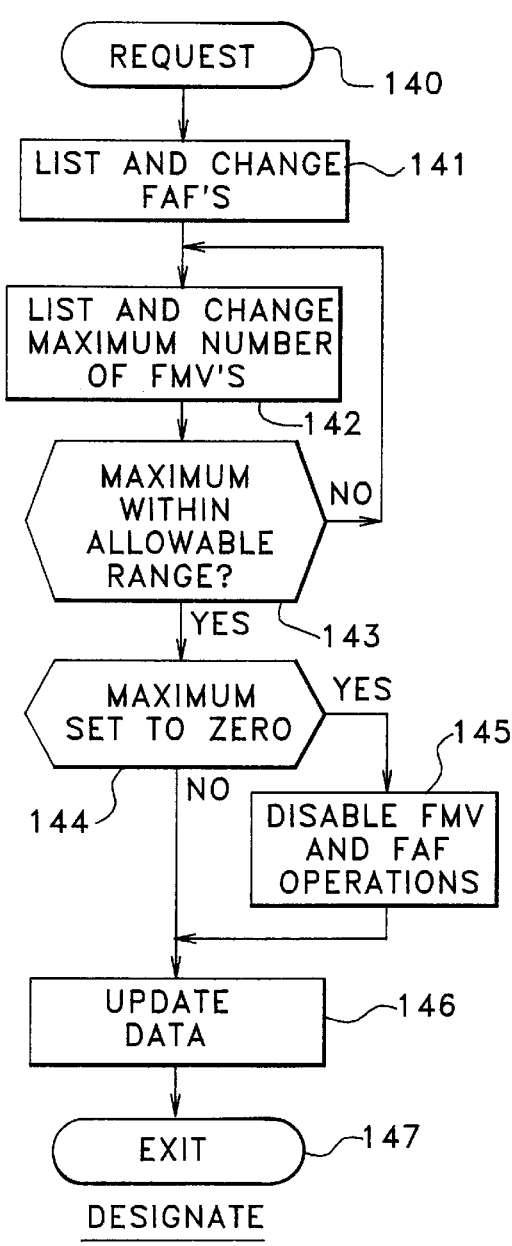
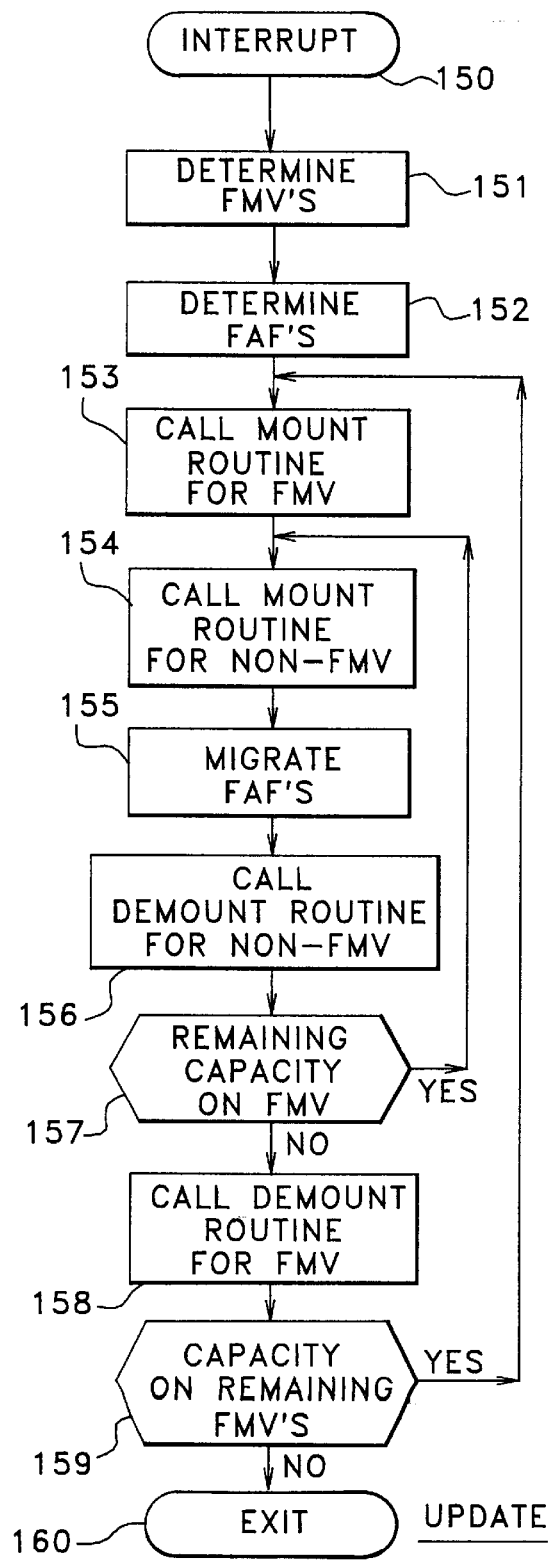
FIG. 12
FIG. 13

MAXIMIZING HIT RATIO IN AN AUTOMATED STORAGE LIBRARY

This is a Continuation of application Ser. No. 07/757,797, filed Sep. 11, 1991.

BACKGROUND OF THE INVENTION

1. Field of the Invention

This invention relates to maximizing the hit ratio in a data storage hierarchy. More particularly, the invention relates to the migration of the most frequently used files to the most frequently used volumes in an automated storage library.

2. Description of the Related Art

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, and optical recording devices. These types of memory actually store data on storage media therein. Each of these other types of memory has a greater storage density and lower cost than main memory. However, these other memory devices do not provide the performance provided by main memory. For example, the time required to properly position the tape or disk beneath the read/write mechanism of the drive cannot compare with the rapid, purely electronic data transfer rate of main memory.

It is inefficient to store all of the data in a computer system on but a single type of memory device. Storing all of the data in main memory is too costly and storing all of the data on one of the peripheral storage devices reduces performance. Thus, a typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often to referred to as secondary data storage, and so on. Generally, the highest level of the hierarchy has the lowest storage density capability, highest performance and highest cost. As one proceeds down through the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories as is well known in the art.

Images may be included in engineering drawings, financial and insurance documents, medical charts and records, etc. Until recently, it was not possible to store image data in memory in a cost effective manner. Images can take many forms, and therefore cannot be encoded into the binary 0's and 1's of computers as easily and compactly as text. Engineering drawings are typically stored on paper, microfilm, or microfiche requiring manual retrieval when access to a drawing is necessary. The same is true for X-rays and other diagnostic medical images, bank checks used in transactions between financial institutions, insurance records, images in FAX documents and so on. Thus, despite modern computers, it is estimated that most of the world's data is still stored on paper. The cost of filing, storing, and retrieving such paper documents including image data is escalating rapidly. It is no longer acceptable to maintain rooms or warehouses stocked full of documents which must be retrieved manually when access thereto is required. Optical scanners are now capable of converting images into machine readable form for storage on peripheral storage devices, but the storage space required for the image data—although significantly less than that required for paper documents—is still quite large. Numerous disks or tapes are required for most business applications. Automated storage libraries have thus been developed to manage the storage of such disks or tapes.

Automated storage libraries include a plurality of storage cells for retaining removable data storage media, such as magnetic tapes, magnetic disks, or optical disks, a robotic picker mechanism, and one or more internal peripheral storage devices. Each data storage medium may be contained in a cassette or cartridge housing for easier handling by the picker. The picker operates on command to transfer the data storage media between the storage cells and the internal peripheral storage devices without manual assistance. An internal peripheral storage device having a storage medium mounted therein is referred to as "occupied". Once a data storage medium is mounted in an internal peripheral storage device, data may be written to or read out from that medium for as long as the system so requires. Data is stored on a medium in the form of one or more files, each file being a logical data set. A file is considered "open" when it is reserved for access by a particular user and the storage medium upon which it resides is mounted in a peripheral storage device and ready to be accessed. For example, in an optical disk library, a file is open if it is reserved for exclusive access and the disk on which it resides is mounted in a drive and spinning. A peripheral storage device having a storage medium therein with an open file is referred to as "active", regardless of whether actual electronic transfer is occurring. A peripheral storage device is also active if the storage medium mounted therein is undergoing access under any standard operating system command not requiring that a file be open, such as a directory read. An active storage medium is general ly considered to be one i n a n active peripheral storage device. The internal peripheral storage devices and storage cells may be considered distinct levels of a data storage hierarchy. In addition, data storage medi a in shelf storage (i.e. not in the storage cells, but instead outsid e the reach of the robotic picker without manual intervention) may be considered yet another level of a data storage hierarchy.

Automated storage librar ies may also include one or more external peripheral storage devices. An external peripheral storage device is a peripheral storage device which, unlike internal peripheral storage devices, is not accessible by the picker but must instead be loaded and unloaded manually. External peripheral storage devices may be included in libraries as a convenience to the library operator. A shelf storage medium requiring brief access will not have to be inserted into the library and retrieved by the picker for mounting in one of the internal peripheral storage devices. External peripheral storage devices may also be considered a distinct level of a data storage hierarchy. Except as explicitly mentioned herein, "peripheral storage devices" hereinafter refers to internal peripheral storage devices only.

Several automated storage libraries are known. IBM Corporation introduced the 3850 Mass Storage Subsystem for the storage and re trieval of magnetic tape modules in the 1970's. More recently, several firms have introduced automated storage libraries for magnetic tape cartridges and optical disks. For example, magnetic tape cartridge libraries are disclosed in U.S. Pat. Nos. 4,654,727, 4,864,438, and 4,864,511. Examples of optical disk libraries can be found in U.S. Pat. Nos. 4,271,489, 4,527,262, 4,614,474, and 4,766,581. The robotic picker mechanisms of these libraries include one or more grippers, each gripper capable of handling one data storage medium at a time. The '489, '262, '474 patents disclose robotic pickers having but a single gripper and the '727, '438, '511, and '581 patents disclose robotic pickers having multiple grippers. IBM also markets the 9246 Optical Library Unit which is a two gripper library.

Although automated storage libraries are valued for their large on-line storage capacity, their performance is also important. One measure of automated storage library performance is the "hit ratio", which is the number of file accesses per storage medium mount. As the hit ratio increases, the number of mount and demount operations the picker must perform decreases. Thus, it is desirable to maximize the hit ratio in an automated storage library.

SUMMARY OF THE INVENTION

In view of the foregoing, it is the principal object of this invention to improve the performance of a data storage hierarchy.

Another object of this invention is to improve the performance of an automated storage library.

Still another object of this invention is to maximize the hit ratio in an automated storage library.

These and other objects of this invention are accomplished by tracking the frequency of usage of each file and rewriteable storage medium in an automated storage library. For each file therein, the library counts the number of times such files are accessed. For each storage medium therein, the library counts the number of mounts thereof. Periodically, the usage statistics are reviewed to determine the most frequently used files and storage media in the library. The most frequently used files are then transferred to the most frequently used storage media, which then become still more frequently used. The less frequently used files are transferred to the less frequently used storage media, which become still less frequently used. By definition, the most frequently used storage media are the most likely to be mounted, thereby increasing the hit ratio. Thus, fewer overall mount and demount operations will be required for file accesses.

The invention also includes several other features. An operator can designate specific files for inclusion on a most frequently used storage medium in anticipation of frequent access thereto. Also, upon initialization of the automated storage library, the most frequently used storage media can be preemptively mounted into peripheral storage devices therein. Provisions can be made to ensure that demounting of one of the most frequently used storage media is likely to be followed by prompt remounting thereof. An automated storage library suitable for implementing the aforementioned features is hereinafter disclosed.

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 12 is a flow chart of the DESIGNATE routine.

FIG. 13 is a flow chart of the UPDATE routine.

DESCRIPTION OF THE PREFERRED EMBODIMENT

Figure 1:
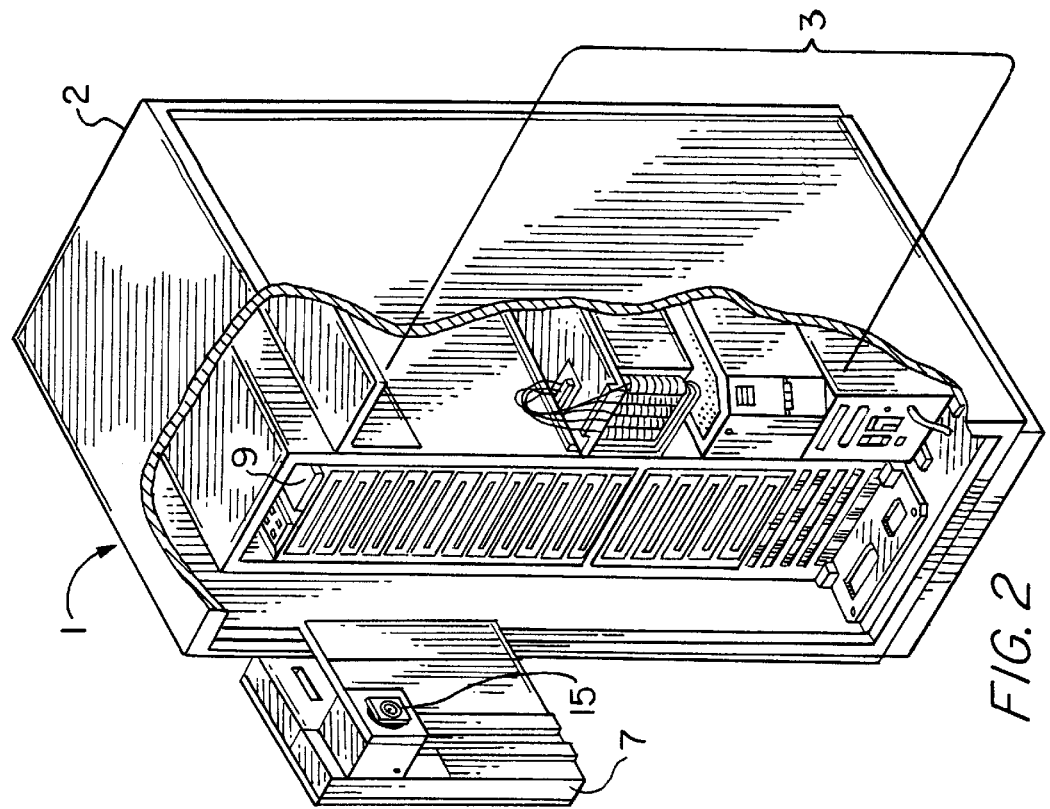
FIG. 1 is a front, perspective cut-away view of an optical disk library of the present invention.

Referring now more particularly to the drawing, like numerals denote like features and structural elements in the various figures. The invention will be described as embodied in an optical disk library. Referring to FIGS. 1–4, various views of such an optical disk library are shown. The library 1 includes a housing 2 enclosing most of the working parts of the library and having front and rear door panels (not shown) for interior access. Library 1 further includes a plurality of optical disk storage cells 3 and a plurality of internal optical disk drives 4. Each storage cell 3 is capable of storing one optical disk having data recorded on one or both sides thereof. The data stored on each side of a disk is referred to as a "volume". In the preferred embodiment, library 1 includes 144 storage cells 3 arranged in two 72 storage cell columns and up to four optical disk drives 4. The optical disks may include ablative, phase-change, magneto-optic, or any other optical recording layers and may be read-only, write-once, or rewritable, as is known, so long as they are compatible with optical disk drives 4. In addition, the optical disks may be recorded in a spiral or concentric track pattern. The precise recording format is not part of the subject invention and may be any known in the art. A robotic picker 5 includes a single gripper 6 capable of accessing an optical disk in any of storage cells 3 or drives 4 and transferring such optical disks therebetween. In the preferred embodiment, the optical disks are configured in cartridges for easy handling by gripper 6 and are 5 and ¼ inch form factor disks, but in alternative embodiments could be any size compatible with drives 4 and gripper 6.

Although the front face of housing 2 is not shown in FIG. 1, certain portions of library 1 protrude through such front face of housing 2 for operator access. These portions are part of a console door 7 and include all or part of a power indicator/switch 8, an entry/exit slot 9, an external optical disk drive 10, a console 11, and a keyboard 12.

Figure 2:
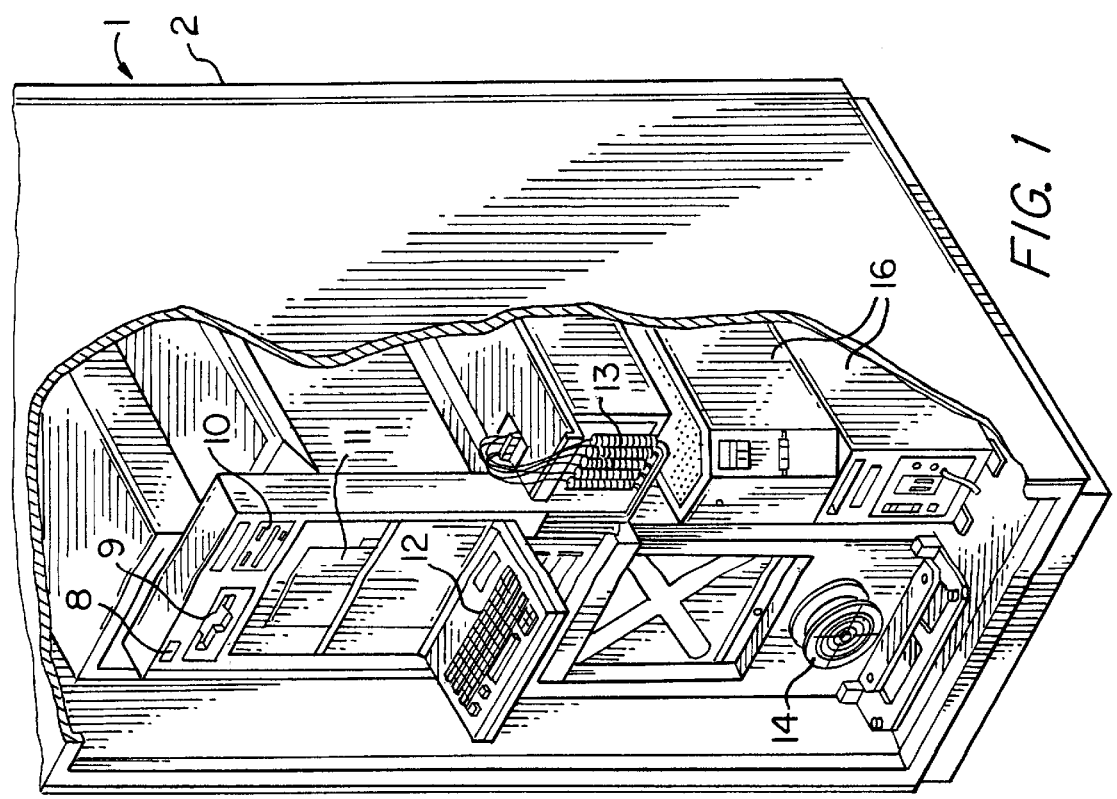
FIG. 2 is the same view as in FIG. 1 except that the console panel has been swung aside and the fan has been removed.
Figure 4:
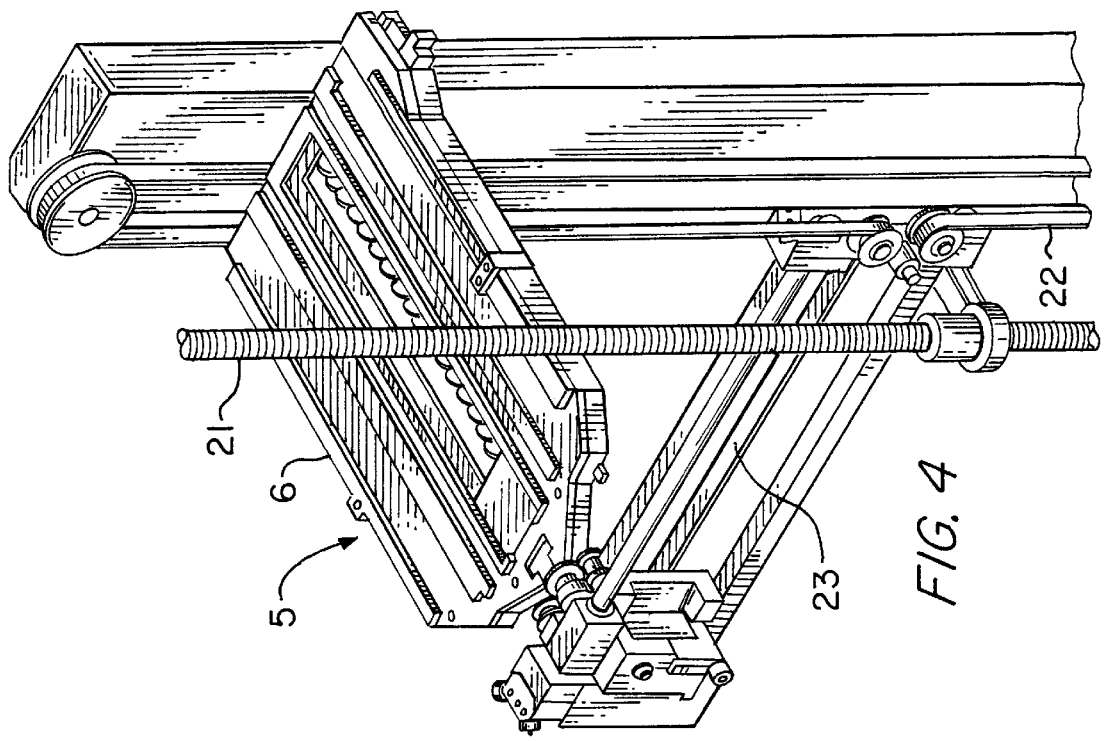
FIG. 4 is a magnified view of the robotic picker and gripper of FIG. 3.
Figure 3:
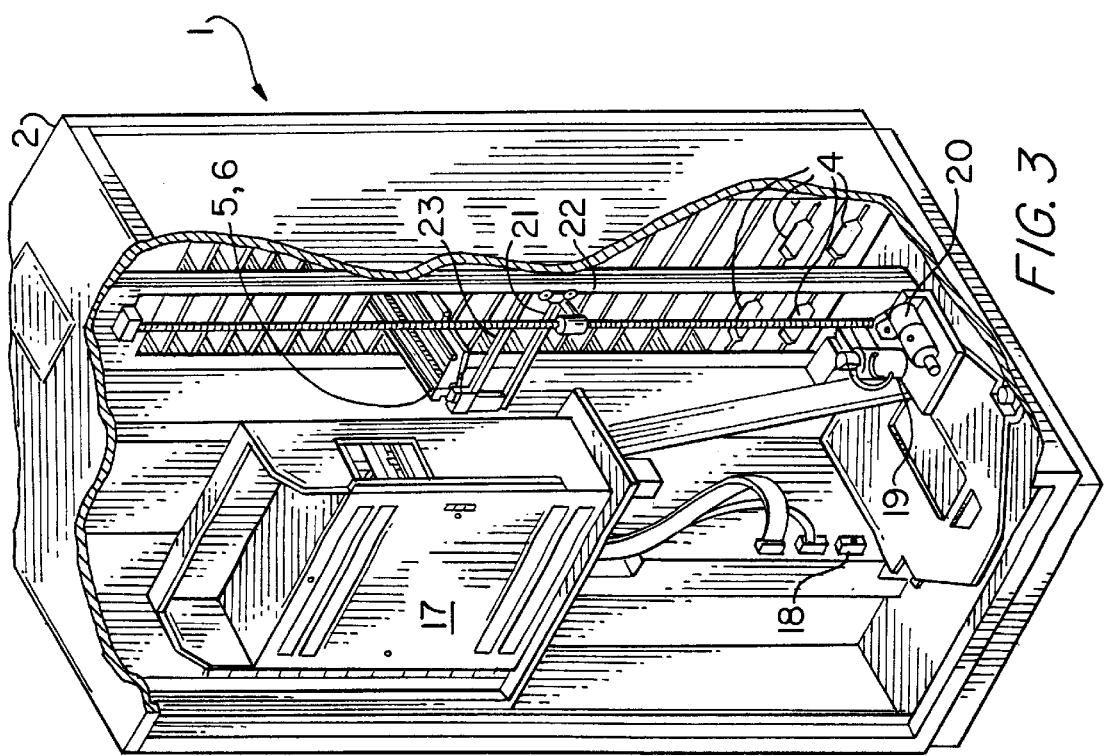
FIG. 3 is a rear, perspective cut-away view of the optical disk library of FIGS. 1 and 2.

Console door 7 can be swung aside to allow access therebehind, when necessary, as shown in FIG. 2. Slot 9 is used for inserting optical disks to or removing optical disks from library 1. Commands may be provided by an operator to library 1, via keyboard 12, to have picker 5 receive an optical disk inserted at slot 9 and transport such disk to a storage cell 3 or drive 4, or to have picker 5 retrieve an optical disk from a storage cell 3 or drive 4 and deliver such disk to slot 9 for removal from library 1. Console 11 allows an operator to monitor and control certain operations of library 1 without seeing inside housing 2. External optical disk drive 10, unlike drives 4, cannot be accessed by gripper 6. Drive 10 must instead be loaded and unloaded manually. Library 1 also includes an optical disk drive exhaust fan 14, an external disk drive exhaust fan 15, and power supplies 16.

Once library 1 is powered on, commands received at keyboard 12 are forwarded to a system controller 17. In the preferred embodiment, system controller 17 is an IBM PS/2 personal computer using the OS/2 operating system. The IBM PS/2 personal computer includes main memory and one or more storage media, such as those in fixed or floppy disk drives. System controller 17 issues instructions to drives 4, external drive 10, and picker 5 as will be described. Drive controller cards 13 and picker 5 controller card 18 convert known small computer system interface (SCSI) command packets issued by system controller 17 into the electromechanical action of drives 4, external drive 10, and picker 5. The movement of picker 5 within library 1 is X-Y in nature.

Movement in the vertical direction is driven by a vertical direction motor 19 and movement in the horizontal direction is driven by a horizontal direction motor 20. Motor 19 turns a lead screw 21 to move picker 5 vertically. Motor 20 turns belts 22 and 23 to move picker 5 horizontally. In addition, picker 5 may be rotated to bring either side of an optical disk within the grasp of gripper 6 to an upright position. The remaining physical features of library 1 are not shown in the drawing, or are shown but not labeled for the purpose of simplification, but are well known.

Figure 5:
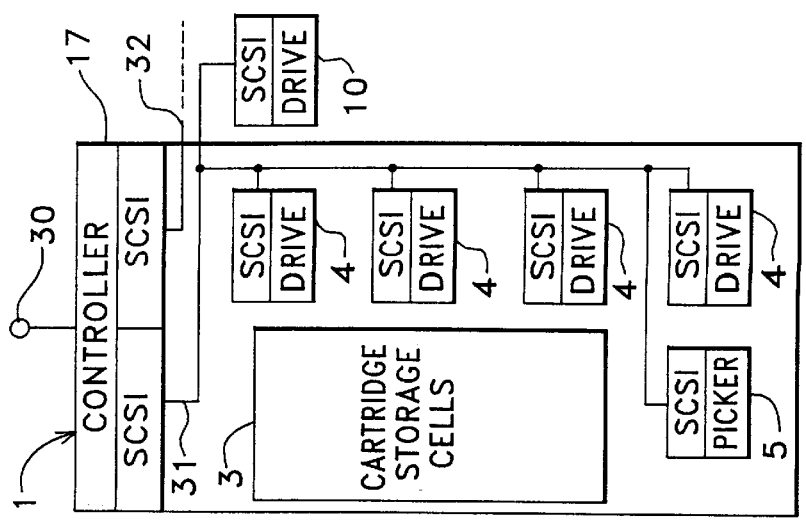
FIG. 5 is a schematic diagram of the optical disk library hardware of FIGS. 1–4.

Referring to FIG. 5, the system connections of library 1 will now be described. System controller 17 is attached to one or more host/system processors 30 to receive input therefrom and to transmit output thereto. System processor 30 can be a host central processing unit (CPU), such as an IBM 3090 mainframe processor using the MVS or VM operating system or IBM AS/400 midrange computer using the OS/400 or AIX operating system, or a network of processors, such as IBM PS/2 personal computers using the OS/2 or DOS operating system and arranged in a local area network (LAN). The connections to system processor 30 are not shown, but are well known. If system processor 30 is an IBM 3090 mainframe processor, the connection could be made using an IBM System/370 channel attachment according to the interface described in IBM Document #SA22-7091-00, "IBM Channel-to-Channel Adapter", June, 1983, IBM Document #GA22-6974-09, "IBM System/360 and System 370 I/O Interface Channel to Control Unit Original Equipment Manufacturers Information", February, 1988, and IBM Document #SA22-7085-01, "IBM System/370 Extended Architecture Principles of Operation", January, 1987, each of which are hereby incorporated by reference. If system processor 30 is an IBM AS/400 midrange computer, the connection could be made using a direct, SCSI interface attachment wherein library 1 is directly controlled by the host system according to ANSI standard X3T9.2/86-109 rev. 5, hereby incorporated by reference. If system processor 30 is a plurality of IBM PS/2 personal computers arranged in a LAN, the connection could be made using the NETBIOS control program interface of the IBM Token Ring Network LAN attachment, according to the protocols described in IBM Document #SC21-9526, "Distributed Data Management Level 2.0 Architecture Reference", March, 1989, hereby incorporated by reference. The preferred embodiment of library 1 will hereinafter be described as used as a file server in a LAN environment wherein library 1 appears to the system as a shared, general storage device.

System controller 17 is attached to drives 4, picker 5, and external optical disk drive 10 via known single-ended SCSI connections, including SCSI bus 31. In an alternative embodiment, system controller 17 may be similarly connected to another physical box to direct the operations of such other box, not shown in the drawing. The other box would be essentially identical to that shown in FIGS. 1–4, except that the other box would not physically include a system controller therein, but would instead be controlled by system controller 17 via SCSI bus 32. The logical subsystem including both physical boxes, one box with a system controller and one box without a system controller, is considered to be a single library. In addition, for use in certain environments, two system controllers can be connected via an RS-232 interface (not shown) to create a library including two boxes with system controllers and two boxes without system controllers, and so on.

Figure 6:
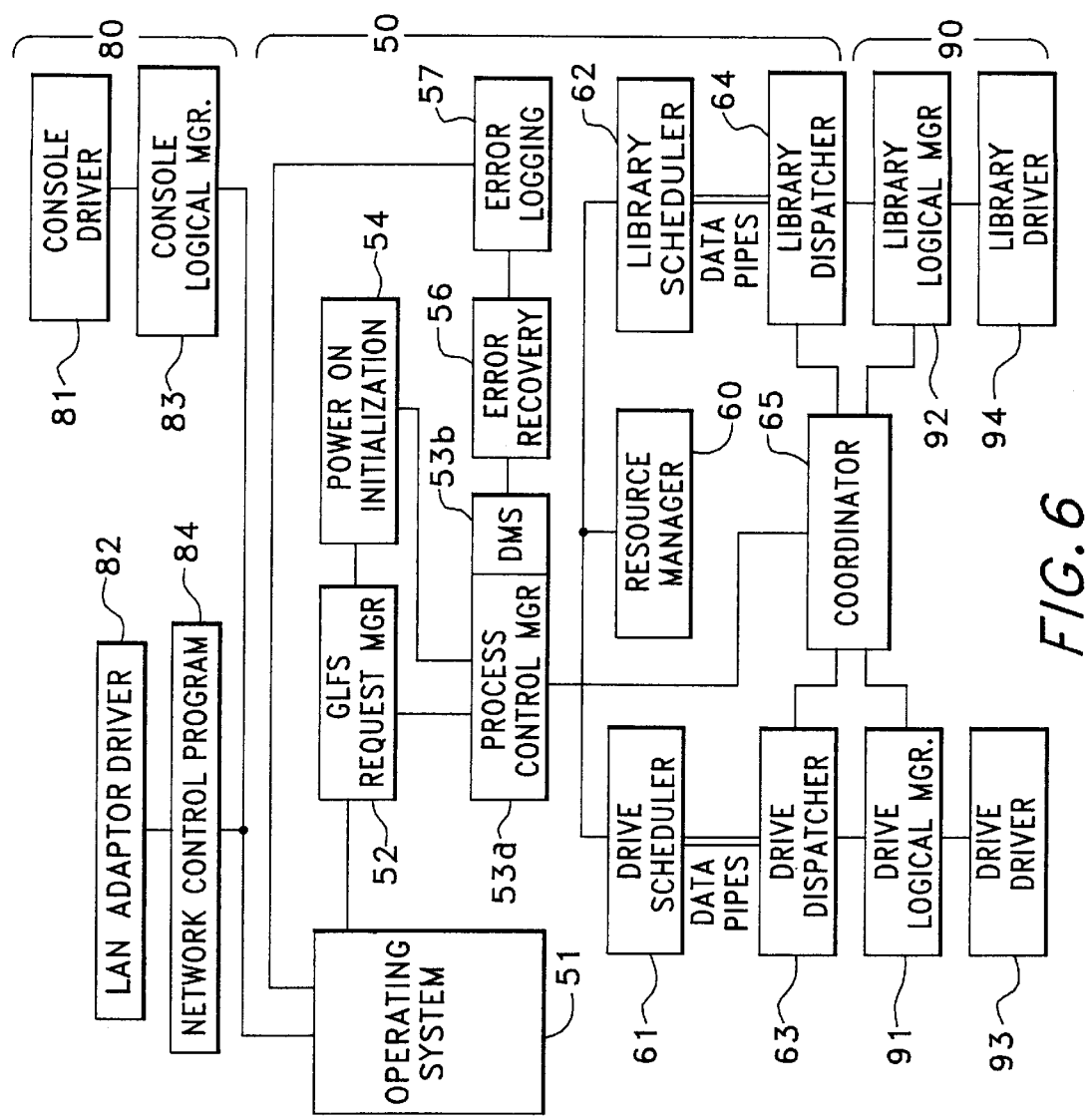
FIG. 6 is a schematic block diagram of the system controller of the optical disk library of FIGS. 1–5.

Referring to FIG. 6, a functional component level description of system controller 17 will now be provided. Generally, system controller 17 is designed to support major library functions such as creating and deleting files, writing to and reading from the files, moving optical disks between storage cells 3, drives 4, and slot 9, and providing statistics on usage and errors. Volumes in the library appear as subdirectories in the root directory of a single drive. Labels assigned to each volume represent the subdirectory name. System processor 30 is able to read the root directory, but cannot store files in the root directory. Any paths accessed on a volume appear as paths under the subdirectory element that represents the volume label.

A generic library file server (GLFS) 50 controls the library with a set of generic, intermediate hardware commands through a formally defined interface which will be described later herein. Data is manipulated by GLFS 50 at the logical record level allowing for data access in quantities spanning from a single byte to complete, variable length data objects. An operating system 51 mediates the flow of control and directs incoming operating system commands from the external interfaces into the library subsystem. Operating system 51 can be any of several known operating systems and in the preferred embodiment is the OS/2 operating system. The use of the OS/2 operating system generally allows for control of library 1 through standard fixed disk operating system commands. Library control is directed through a unique command, DosFsCtl . This command is used to support initialization, entry/exit of an optical disk from library 1, read/store the library map file, mount/demount an optical disk in drive 10, etc. Drive control is directed through a unique command, DosDevIOCtl. The remainder of the programmed control for library 1 is retained in microcode which is uploaded into the main memory of system controller 17 from a storage medium resident therein at initialization. In alternative embodiments, some function required to support the microprogrammed control may also be provided as a utility to the operating system running in system processor 30.

The OS/2 operating system includes several advanced operating system concepts integral to system controller 17. These advanced concepts are dynamic link libraries, installable file systems, and multitasking. A dynamic link library (DLL) is a file containing a set of functions each of which may be dynamically loaded as needed. Normally, a program is compiled and linked with the compiled program code of all of the functions the program might invoke before it can be executed. A DLL permits a program to invoke functions compiled and linked into independent modules of program code. OS/2 includes a set of DLL modules that can be invoked as required. Using a custom DLL module, OS/2 can be made to control non-standard storage devices. The custom DLL module is known as an installable file system (IFS). Each function supported by an IFS is known as an entry point. For additional information on installable file systems, see IBM Document #G362-0001-03, "IBM Personal Systems Developer", Fall, 1989, hereby incorporated by reference. In the preferred embodiment, GLFS 50 is implemented as an IFS to the OS/2 operating system with prescribed entry points.

Another important aspect of the OS/2 operating system is multitasking. Multitasking is the ability of a system to run multiple programs concurrently. The system processor's time is apportioned amongst tasks each appearing to be running as if no other tasks are present. A separate environment is maintained for each task; memory and register contents for each task are isolated to avoid interference with each other. A task and its associated environment is referred to as a "thread". Programs can include a code area and a data area in the main memory of the IBM PS/2 model 80 personal computer. The code area is the section of memory containing the instructions being executed for any given thread. The data area is the section of memory (or registers) that is manipulated during execution of the instructions. Because the same code area may be used for several threads, each thread may point to the same code area for execution but includes its own isolated data area.

The upper interface translator 80 is responsible for translating between upper interface commands and those of GLFS 50. The lower interface translator 90 is responsible for translating between the commands issued by GLFS 50 and those of the lower interface. Translators 80 and 90 are each implemented as distinct linkable modules with clearly defined interfaces, thereby permitting easy attachment of library 1 to new upper and lower interfaces. The only impact of attachment to a new interface is the creation of a new portion of translators 80 and 90—the generic nature of GLFS 50 allows it to remain unchanged.

The upper interfaces of library 1 include the library configuration, map, and system performance files, console 11 (and keyboard 12), and the network interface. The library configuration, library map, and system performance files are not shown in the drawing, but are stored on the fixed disk drive of system controller 17. These files are maintained by the library operator or maintenance personnel. The library configuration file lists various characteristics of the hardware configuration of library 1, such as the number of physical boxes in library 1, the number of drives 4 and 10 in each physical box, whether a drive is an internal drive 4 or an external drive 10, the number of storage cells 3 in each physical box, the SCSI addresses of each picker 5 and drive 4 or drive 10, etc. The library map file lists various characteristics of the optical disks in library 1, such as the volume label of each optical disk in library 1, the address of the home storage cell for each optical disk in library 1, free space information for each optical disk, and certain usage statistics for each optical disk, such as the number of mounts, the date and time of last access, the number of accesses to each file on the optical disk, etc. System controller 17 uses the library configuration and map files to identify the number and arrangement of resources in the library, and adjusts the files as the status of the resources in library 1 changes. The system performance file lists certain operator specified parameters, such as operator specified frequently accessed files (FAFs) and the maximum number of frequently mounted volumes (FMVs), which are further described later herein. Console 11 is used to exhibit the ongoing status of the library components and make commands and utility functions, such as error reporting, available to the operator. Keyboard 12 allows the operator to make manual input to library 1, such as in response to information received via console 11. Console 11 and keyboard 12 are linked to GLFS 50 by console driver 81 and console logical manager 83. The network is linked to LAN adapter driver 82 and NETBIOS.network control program 84. The network interface allows a processor on the network to remotely gain access to library 1, which acts as a file server thereto.

GLFS request manager 52 is the interface to operating system 51 and responds to the same set of entry points that the OS/2 operating system uses to communicate with any IFS. GLFS request manager 52 is responsible for breaking down operating system commands to accomplish library functions, which it does by calling routines found in the process control manager (PCM) 53*a* to accomplish each step. PCM 53*a* is a set of utility routines, some of which require the generation of request blocks, that assist the system in breaking down and processing commands. The routines parse directory path strings, enter optical disks into the library, locate volumes, allocate drives to a volume, flip optical disks so as to present the volume on the opposite side for mounting, mount volumes, demount volumes, exit optical disks from the library etc. and will be described further where appropriate. The directory management scheme (DMS) 53*b* is a module of code which satisfies the IFS file specification for monitoring the open/closed status of the user files in library 1, as is well known, and is used to manipulate such user files. Use of the IFS interface in such an internal module allows for easy adaptation of external IFS-style implementations of directory management schemes.

The power on initialization (POI) module 54 manages the power on and reset functions of the controller and is invoked by operating system 51 at initialization. POI module 54 is responsible for functions such as determining and reporting the results of component self-testing and reading the library configuration and status files. Errors are processed by an error recovery module 56 and an error logging module 57. Recovery module 56 processes all errors, including dynamic device reallocation and retries of device commands. Logging module 57 is responsible for saving error information and reporting it to the operator via console 11.

The resource manager 60 dynamically allocates and deallocates control blocks in the data area of system controller 17, including request blocks, drive control blocks, and error information blocks. Request blocks are used to request a hardware event for drives 4 or picker 5. Drive control blocks are used to store status information relating to drives 4, as will be described later herein. Error information blocks are used to store the information needed to report, isolate, and possibly retry an error. The allocation and deallocation of control blocks is accomplished using a list of the free space available in the main memory of the IBM PS/2 personal computer maintained by resource manager 60. Note that both error recovery module 56 and resource manager 60 are connected to most of the components of system controller 17 shown in FIG. 6, such connections not being shown for simplification.

The schedulers 61 and 62 are responsible for verifying some of the contents of the request blocks and entering them into the pipe for the hardware device that will process the request. A pipe is a queued data path leading from one thread to another and can be accessed by any thread knowing the assigned identifier of the pipe. The dispatchers 63 and 64 are responsible for validating the request blocks, ensuring that the requests are ready to be executed, and dispatching the request as appropriate to the drive logical manager 91 and the library logical manager 92. The coordinator 65 is responsible for coordinating request execution for dispatchers 63 and 64. The coordinator accomplishes such using a table having an entry for each request block received from PCM 53a. Each entry lists the supporting request blocks associated with a particular request block. A request requiring the prior completion of another request is referred to as "dependent", the request that must first be completed is referred to as "supporting". Coordinator 65 withholds execution of dependent request until associated supporting requests have been executed. If a supporting request fails execution coordinator 65 rejects requests dependent thereon.

Logical managers 91 and 92 are responsible for translating the generic library commands in the form of request blocks into the equivalent device level commands in the form of SCSI data packets. Logical managers 91 and 92 are also responsible for receiving hardware status information from the drive driver 93 and the library driver 94 respectively. Drivers 93 and 94 directly manipulate the hardware and physical memory. Drivers 93 and 94 perform all communications with their respective hardware and also respond to interrupts. Logical manager 91 and drive driver 93 control drives 4, logical manager 92 and library driver 94 control picker 5. Although not shown in FIG. 6 for simplicity, there are actually multiple drive dispatchers 63, drive logical managers 91, and drive drivers 93—one set for each drive 4 or 10 in library 1. Each set is connected to a different data pipe.

METHOD OF OPERATION

Initialization of library 1 is accomplished using operating system 51, GLFS request manager 52, resource manager 60, and POI module 54. After self-testing of the library hardware to verify correct function, operating system 51 is loaded and uses the OS/2 CONFIG.SYS file to set the operating system parameters and load drivers. Operating system 51 then generates an initialization command which is passed to GLFS request manager 52 and then on to POI module 54. POI module 54 reads the library configuration, map, and system performance files, creates the necessary internal data structures in the main memory of the IBM PS/2 personal computer, and initiates separate threads for each hardware component of library 1 specified in the library configuration file. Resource manager 60 initializes internal tables used in memory management. POI module 54 then queries system controller 17 and controller cards 13 and 18 for power-on self-test results and reports any problems to error recovery module 56. Any errors detected during initialization are logged by error logging module 57 and, if possible, recovered by error recovery module 56. After error detection and logging, POI module 54 queries optical disk map 115 to determine the FMVs (the most frequently mounted volumes) in the library and then initiates requests for such most frequently mounted volumes to be preemptively mounted in drives 4. When system controller 17 is in a ready state, the system is receptive to activity from console 11 or the network interface.

Figure 7:
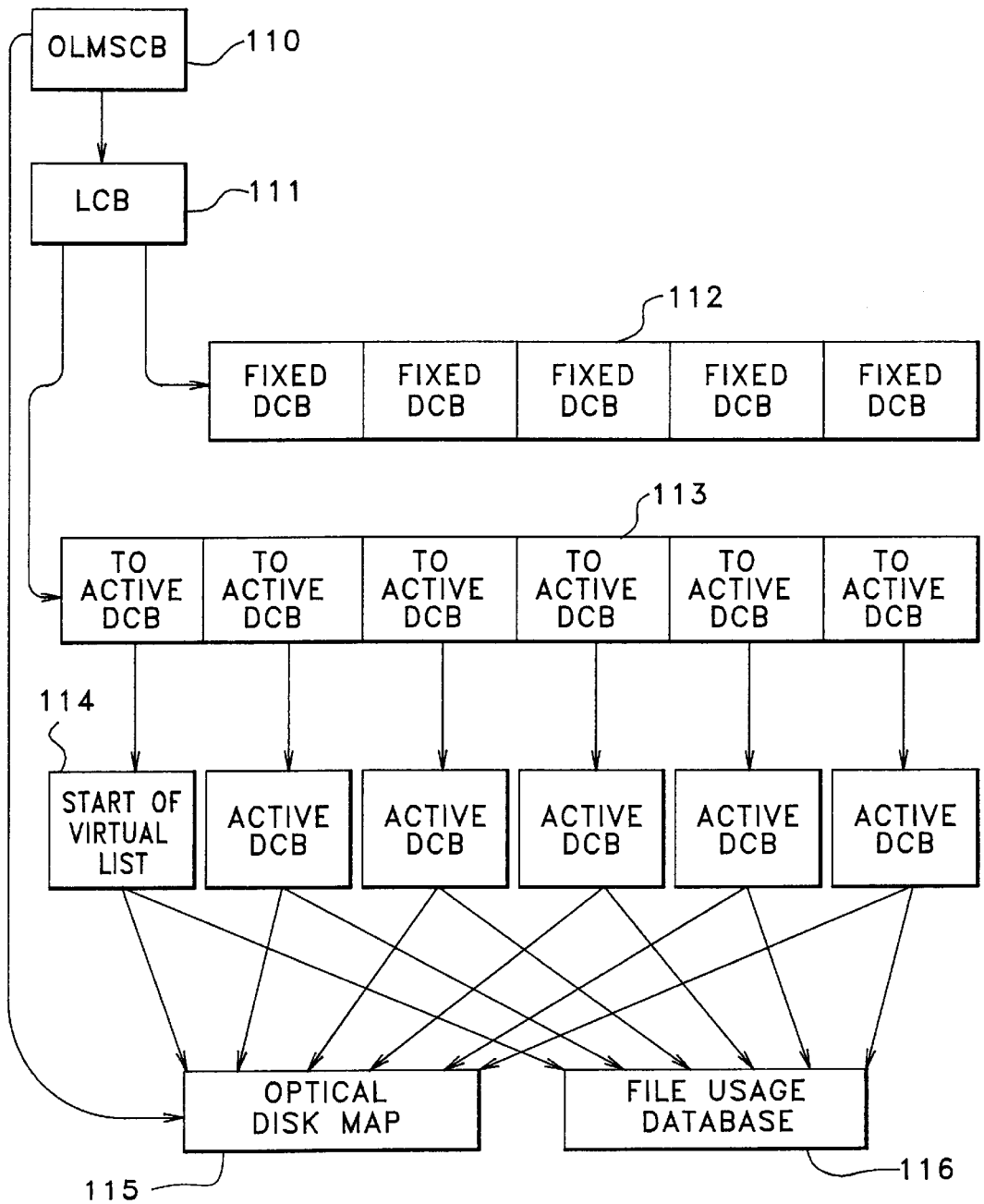
FIG. 7 is a schematic block diagram of the internal data structures created during initialization.

Referring to FIG. 7, the internal data structures include the optical library main system control block (OLMSCB) 110, one or more library control blocks (LCB) 111, fixed drive control blocks (DCB) 112, an active DCB pointer array 113, active DCBs 114, an optical disk map 115, and a file usage database. Pointers are represented by arrows in FIG. 7. OLMSCB 110 includes the number of physical boxes in library 1, the maximum number of FMVs, a pointer to the optical disk map, and a pointer to a LCB 111 for each physical box in library 1 (for convenience, only one such LCB is shown in the drawing). Each LCB 111 includes for the respective physical box the operational status of picker 5 (on-line, off-line, failed), the number of drives 4 and 10 therein, the SCSI address of picker 5 therein, the number of storage cells 3 therein, the address of each storage cell 3 and slot 9 therein, and a pointer to fixed DCBs 112 for each drive 4 or 10 therein. Each LCB 111 also includes a pointer to active DCB pointer array 113, which in turn includes a pointer to an active DCB 114 for each drive 4 or 10 therein.

Five fixed DCBs 112 are shown in the drawing, one for each drive 4 and drive 10 in the preferred embodiment. Each fixed DCB 112 includes certain drive specific information about drives 4 and 10 which is "fixed" in that it does not change as optical disks are manipulated about library 1. Such information includes for the respective drive the operational status of the drive including a usage attribute indicating whether use of the drive is restricted to certain functions (such as write only). Fixed DCBs 112 are used as permanent records of such information to create active DCBs 114 as optical disks are manipulated about library 1, as will be described.

Six active DCB pointers 113 and active DCBs 114 are shown in the drawing, one for each drive 4 and drive 10 in the preferred embodiment, and one for the virtual list, which is a linked list of the access records for certain volumes, as will be described. Active DCBs 114 include certain volume specific information about drives 4 and 10 and the virtual accesses. The information is "active" in that it does change (i.e. it is updated) as optical disks are manipulated about library 1. Such information includes for the respective drive or virtual access the appropriate information from fixed DCBs 112 and also the occupancy status of the drive (whether or not there is an optical disk mounted therein), usage statistics such as the last access time and user count for a volume therein or virtual access, an index into the optical disk map for the entry therein which describes the volume mounted in the drive or virtual access, and an index into the file usage database. The index into the optical disk map is used by DMS 53b to locate a volume in library 1, as required. The user count is the number of current accesses ongoing for a volume, an access being an open file or any standard operating system command not requiring that a file be opened, such as a directory read.

Optical disk map 115 includes an entry for each storage cell 3 in library 1. An entry for an empty storage cell 3 is blank. An entry for a full storage cell 3 lists the owner of the disk therein, the home storage cell 3 and current location of the disk, and for each volume on the disk, the volume label, the number of mounts, the available free space, and other usage statistics. File usage database 116 includes an entry for each file stored in library 1, indexed by volume. Each file entry includes the size of the file, the number of times the file has been accessed, and an indication of whether the file is an operator specified FAF. The aforementioned data structures also include other information required for the operation of library 1, although not explicitly described for simplicity, as is known in the art.

Figure 8:
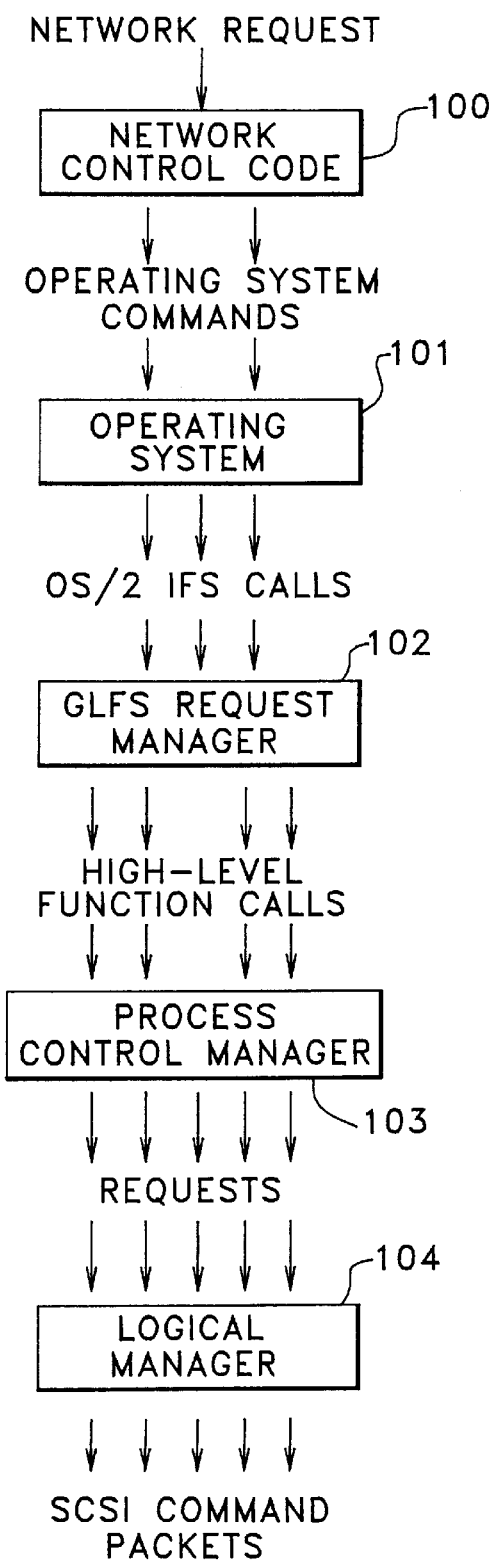
FIG. 8 is a flow chart of the operations of the system controller of an optical disk library in translating a network request received at its upper interface into SCSI command packets at its lower interface according to the present invention.

Referring to FIG. 8, the operations of system controller 17 will now be described. When a request is received from the network interface, the network control code will convert the request into a set of standard OS/2 operating system commands at step 100. Operating system 51 will then issue the appropriate operating system calls to process the operating system commands at step 101. GLFS request manager 52 receives the calls and breaks them down into simpler functions. For each function, GLFS request manager 52 will call a routine in PCM 53a and/or DMS 53b and pass the appropriate subset of the data required for the routine as parameters at step 102. For each routine requiring hardware activity, PCM 53a and/or DMS 53b at step 103 calls resource manager 60 to create a hardware level request block, issues such block to schedulers 61 and 62, and informs coordinator 65 of any hardware dependencies to allow for the proper sequencing of the requests. PCM 53a also returns control and status information to GLFS request manager 52 as each routine is completed.

After checking the list of free space available in the main memory of the IBM PS/2 personal computer, resource manager 60 allocates the required memory space for the request block. The routines calling resource manager 60 provide most of the information for a control block, resource manager 60 fills in certain additional information such as a control block identifier and a request block identifier. Drive scheduler 61 and library scheduler 62 receive all hardware event requests as request block identifiers and forward them to the data pipes connected to drive dispatcher 63 and library dispatcher 64 respectively. Dispatchers 63 and 64 continually check their respective data pipe for the existence of a request block identifier. After receiving a request block identifier, dispatchers 63 and 64 call coordinator 65 to determine if the request block is ready to be executed. Coordinator 65 checks the table of request block dependencies and prevents dispatchers 63 and 64 from issuing the request block identifier until all supporting request blocks have been completed. When all request block dependencies have been met, the request block identifier is issued to the respective logical manager 91 or 92.

At step 104, logical managers 91 and 92 receive the request block identifiers, construct the necessary SCSI hardware command packets to accomplish the requests, and issue the packets to drivers 93 and 94. The hardware then physically performs the requests. As each request is completed logical managers 91 and 92 signal such completion. Dispatcher 63 or 64 then issues the identifier of the next request block to the respective logical manager 91 or 92. Generally, library mount/demount operations will continue on an as needed basis as long as there are existing requests to mount volumes. When a volume is first mounted in a drive 4 or 10, an active DCB 114 pertaining to the access of such volume is created. The active DCB is created by copying the drive specific information relating to the drive 4 or 10 in which the volume is mounted from the fixed DCB 112 into a block of memory and adjusting the appropriate pointers. During access to the volume, the volume specific information about such access is updated and stored in the active DCB 114. If the volume is demounted, the volume specific information is deleted from active DCB 114, except for the occupancy status information, to indicate that the respective drive 4 or 10 is again empty. When a volume is again mounted in the respective drive 4 or 10, the active DCB 114 is again updated as necessary with the appropriate volume specific information, and so on.

Volumes are demounted to free a drive 4 to service an existing mount request, provided the drive 4 is inactive, thereby maintaining drives 4 in an occupied state. Such occupancy maximizes the amount of data ready for access. When there are no pending mount requests, however, drives 4 may be preemptively demounted to ensure the existence of an unoccupied drive 4 to service forthcoming mount requests, and to reduce aging of drives 4 during idle periods. If all drives 4 are occupied, one drive 4 may be emptied. In addition, the activities of drives 4 are periodically reviewed to determine if the volumes in any of the occupied drives 4 should be preemptively demounted because library 1 is relatively idle. During normal library operations a drive 4 will therefore be empty only after the preemptive demount of a volume. The criteria for selecting volumes for preemptive demount when all drives 4 are occupied and there is no pending mount request is different from those criteria used during the periodic review of the activity of drives 4.

A drive 4 can physically write to or read from only one optical disk at any given time. A request to mount a volume at a time when there are no unoccupied, inactive drives 4 normally results in the rejection of the request. However, using the virtual drive feature, a request to mount a volume when all drives 4 are occupied and active allows for access to more volumes than there are drives 4 by temporarily demounting the least recently used volume. The temporarily demounted volume is referred to as "swapped out" and the newly mounted volume is referred to as "swapped in". The drive specific information for the drive 4 is deleted from the active DCB 114 but the volume specific access information for the temporarily demounted volume is retained therein. The active DCB 114 for the temporarily demounted volume is then retained in a special form of active DCB 114 referred to as the virtual list. The virtual list DCBs differ from other active DCBs in that they contain pointers to each other to create a linked list. The virtual list permits resumption of the operations on the volume by remounting at the next volume mount request or, alternatively, caching can be used to continue access without remounting. Upon remounting of the volume, the appropriate virtual list DCB is deleted from the linked list and the volume specific information copied into the active DCB 114 for the appropriate drive 4. Because such access information is retained, a volume that has been swapped out is still considered active and under access. Also, remounting of a volume that has been swapped out can occur in any drive 4 so long as the access information is provided to the active DCB 114 for the respective drive; a volume access is not tied to the original drive 4 in which the volume is mounted. A volume that has been swapped out will not logically appear to be in its home storage cell 3 as remounting must be distinguished from the mounting of a volume that has not been swapped out. The actual number of drives 4 in the library is thus transparent to users.

The following description of the aforementioned routines has been simplified wherever possible for convenience to eliminate features already described herein or known in the art. For example, the information in OLMSCB 110, LCB 111, DCBs 112 and 114, optical disk map 115 and file usage database 116 are not always referenced as their location, content, and use have already been described. The term "return" is used to refer to an exit from a routine back to the step which called that routine, including some indication to the calling step of the result of the routine.

Figure 9:
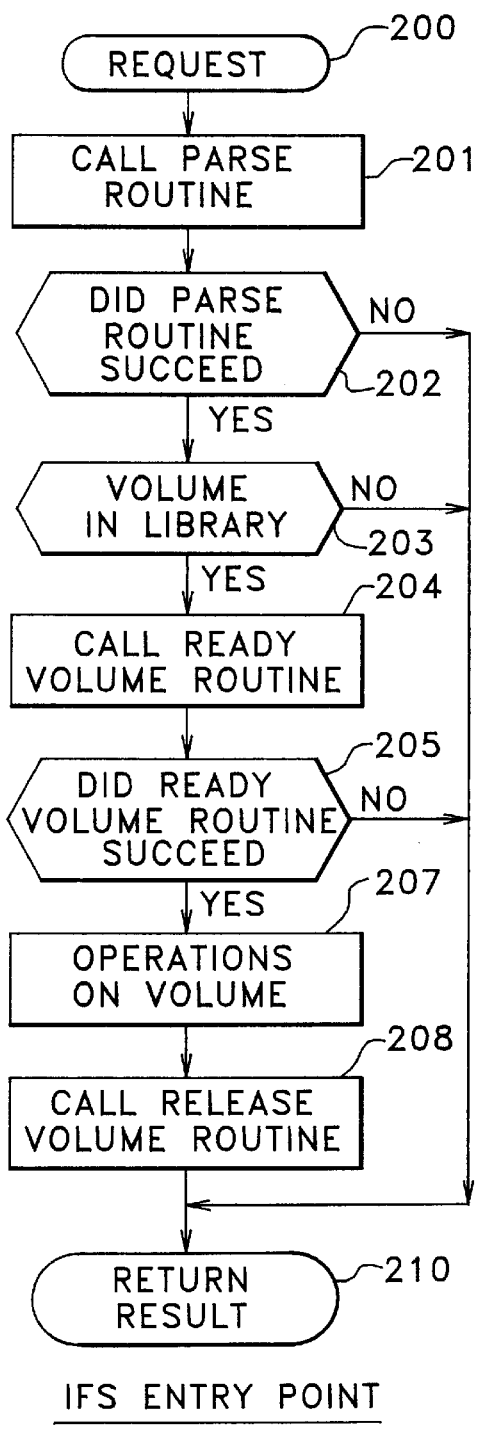
FIG. 9 is a flow chart of the operations of FIG. 8 for a representative IFS entry point.

Referring to FIG. 9, the high level operations of system controller 17 will now be described in further detail beginning at a representative IFS entry point into GLFS 50 requesting access to a specific, designated volume. The request to access a designated volume is received from operating system 51 by GLFS request manager 52 at step 200, which then directs steps 201–210 by calling various PCM 53a routines. At step 201, the PARSE routine is called to extract the volume label from the request and locate the designated volume using the optical disk map. Step 202 branches according to the result of the PARSE routine. If the PARSE routine returns an error message (i.e. is not successfully completed) such error message is returned at step 210. If the PARSE routine is successful, step 203 branches according to the location of the designated volume. If the designated volume is not located in library 1, such volume cannot be accessed therein. The flow therefore skips to step 210 and an error message is returned. If the designated volume is located in library 1, the READY VOLUME routine is called at step 204. The READY VOLUME routine is used to determine several subsequently required operations depending upon the location of the designated volume. Upon completion of the READY VOLUME routine, step 205 branches according to the result of the READY VOLUME routine. If the READY VOLUME routine returns an error message (i.e. is not successfully completed) such error message is returned at step 210. If the READY VOLUME routine is successful, operations on the designated volume according to the request occur at step 207. When such operations complete, the RELEASE VOLUME routine is called at step 208 to determine if preemptive demounting of a volume is appropriate even though library 1 is not idle. When the RELEASE VOLUME routine completes, the result is returned at step 210.

During operation, the aforementioned routines may call other routines. For example, the RELEASE VOLUME routine may call for volumes to be mounted, demounted, swapped in and out using the virtual list, etc. Except as further provided herein, these additional routines are not relevant to the subject invention. Additional teaching of these routines can be found in commonly assigned and co-pending U.S. patent application Ser. No. 07/526,256, filed May 21, 1990, hereby incorporated by reference now U.S. Pat. No. 5,239,650.

Figure 10:
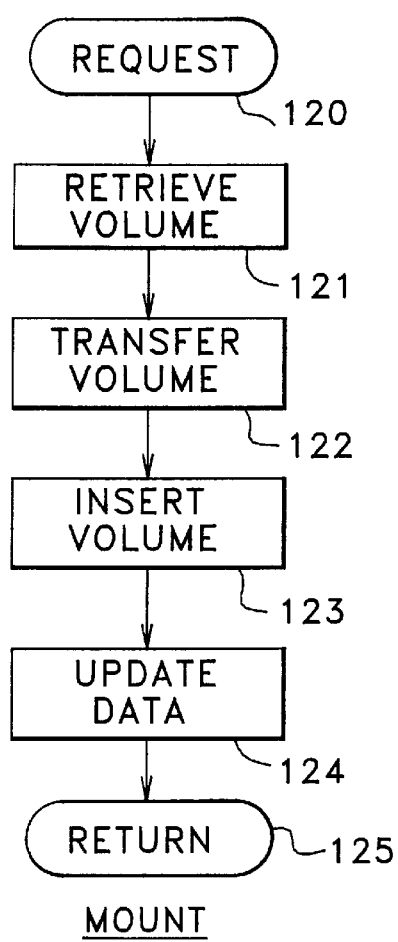
FIG. 10 is a flow chart of the MOUNT routine.

One routine sometimes called during library operation is the MOUNT routine. Referring to FIG. 10, the MOUNT routine begins with its request at step 120. At step 121, the designated volume is retrieved from its current location by picker 5. The designated volume is then transferred to the allocated drive 4 at step 122 and inserted therein at step 123. Step 123 also includes spinning up the allocated drive to operating speed. At step 124, the internal data structures are updated as required, including incrementing the number of mounts for the volume in optical disk map 115. The MOUNT routine returns at step 125.

The file size and number of file accesses for each file in file usage database 116 is updated in a manner similar to the number of mounts in optical disk map 115. After the volume is mounted, with each file access, the number of file accesses for the respective file in file usage database 116 is incremented. Such updating of file usage database 116 occurs during step 207 and, because of its simple nature, is not described further herein.

Figure 11:
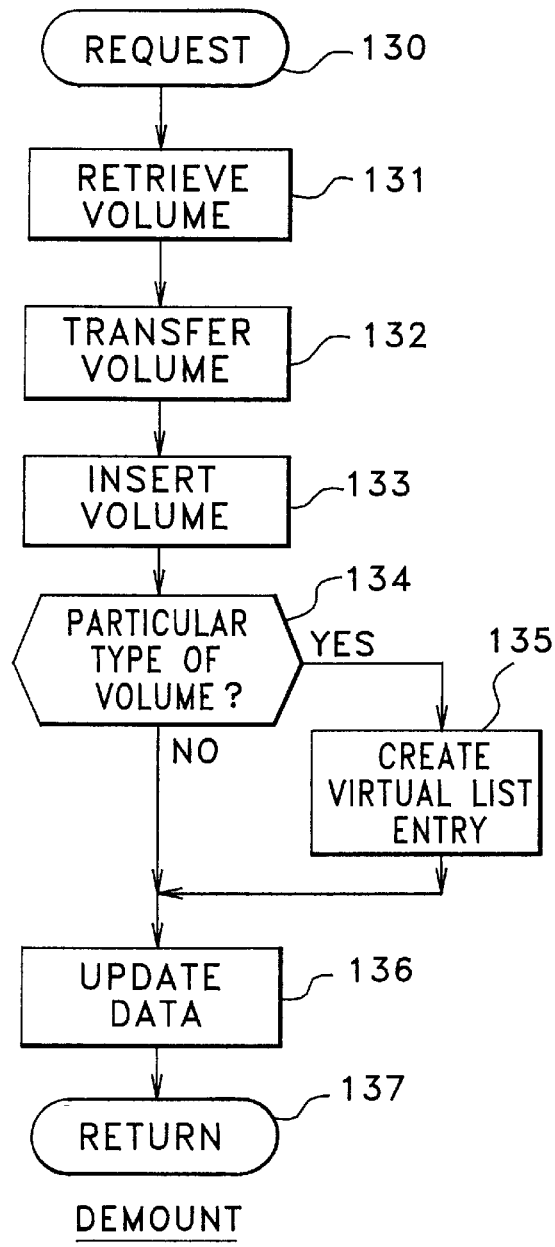
FIG. 11 is a flow chart of the DEMOUNT routine.

Another routine sometimes called during library operation is the DEMOUNT routine. Referring to FIG. 11, the DEMOUNT routine begins with its request at step 130. At step 131, the designated volume is spun down and retrieved by picker 5. The designated volume is then transferred to its home storage cell 3 at step 132 and inserted therein at step 133. In alternative embodiments, the designated volume may be transferred to an alternate storage cell 3 (i.e. not to its home storage cell) if it is a FMV. For example, a set of storage cells 3 closest to drives 4 can be reserved exclusively for occupancy by FMV. In another example, a FMV could be transferred to the unoccupied storage cell 3 closest to drives 4. The alternate embodiments improve library performance further by maintaining FMVs as close to drives 4 as possible. Step 134 branches according to whether the volume demounted is an active non-FMV demounted to service an existing mount request or an FMV (active or inactive) demounted to service an existing mount request of a non-FMV. If the demounted volume is in one of the aforementioned categories, an entry is made in the virtual list for the demounted volume at step 135. Such creation of the virtual list entry replaces the virtual list entry creation otherwise described in the commonly assigned co-pending U.S. Patent Application incorporated herein by reference. If the volume demounted is an inactive non-FMV, or an inactive FMV which is preemptively demounted, the flow skips to step 136 at which time the otherwise ordinary updating of the internal data structures occurs. The DEMOUNT routine returns at step 137. At any time during the operation of the library, an operator can initiate the DESIGNATE routine to alter the operator specified FAFs or the maximum number of FMVs via keyboard 12. Referring to FIG. 12, the DESIGNATE routine will now be described beginning with the request at step 140. At step 141, the operator is presented with a list of the current operator specified FAFs and enters any desired changes thereto. At step 142, the operator is presented with the current maximum number of FMVs and enters any desired change thereto. Step 143 checks to determine whether the entered number falls within the allowable range and branches accordingly. The allowable range is zero to four. Four is used as the maximum of the range because it is the number of drives 4 in the library, thereby simplifying programming. In alternative embodiments the maximum of the range could be a different number x matching the number of drives or maximum mountable volumes in the library, or could be any other number desired. If the number is outside of the allowable range, the flow loops back to step 142 to permit the operator to enter another desired maximum number of FMVs. If the number entered is within the allowable range, the flow continues at step 144. Step 144 branches according to whether the operator entered zero as the maximum number of FMVs. If so, all library operations relating to the use of FMVs and FAFs are disabled at step 145. If not, the flow skips to step 146 at which time OLMSCB 110 is updated with the new data. The request then exits at step 147.

The UPDATE routine is initiated by system controller 17 occasionally to be sure the most frequently used files and volumes are properly designated as FAFs and FMVs respectively. Referring to FIG. 13, the UPDATE routine will now be described. The UPDATE routine begins with the interruption of console 11 at step 150 during a period of relative library inactivity. At step 151, the data in optical disk map 115 is examined to determine a new set of FMVs ranked by frequency of mounting, up to the maximum number permitted to be selected. Normally, the maximum number of FMVs will be automatically selected. However, under certain conditions (such as a library with few volumes therein, or a library with an equal number of mounts of most volumes therein) the maximum number may not be reached. Because drives 4 will only allow access to a single volume (i.e. single side) of an optical disk at a time, the determination excludes the selection as FMVs both volumes on an optical disk. In alternative embodiments in which each optical disk is a single volume (i.e. drives 4 can access either side of a disk mounted therein), such exclusion is unnecessary.

At step 152, the data in file usage database 116 is examined to determine a new set of FAFs. Any operator specified FAFs (as specified during the DESIGNATE routine) are first maintained as such. If the operator specified FAFs exceed the capacity of the FMVs, the UPDATE routine is aborted and an error message is returned (not shown). Additional FAFs are then automatically selected according to their number of accesses, until the amount of data in the FAFs is at or near the capacity of the FMVs. At step 153, the MOUNT routine is called to mount the most FMV in a drive 4. At step 154, the MOUNT routine is called to mount in another drive 4 the non-FMV having the most FAF not already stored on a FMV. Operator specified FAFs are considered to be more frequently accessed than any automatically selected FAFs, which in turn are ranked by their respective number of accesses. All FAFs on such non-FMV are then migrated to the most FMV at step 155 and the non-FMV is demounted by a call to the DEMOUNT routine at step 156.

Step 157 branches according to the remaining capacity of the most FMV. If the most FMV has sufficient capacity remaining, the flow loops back to step 154 to have mounted the non-FMV having the remaining most FAF not stored on a FMV. Eventually, the capacity of the most FMV is approached and step 157 branches to step 158 to call the DEMOUNT routine to demount the most FMV. Step 159 also branches, but according to the status of the FMVs. If there is another FMV with sufficient remaining capacity, the flow loops back to step 153 to call the MOUNT routine to mount the next most FMV in a drive 4. The process continues until the capacity of the last FMV is approached, at which time step 159 branches to step 160 to exit the UPDATE routine.

While the invention has been described with respect to a preferred embodiment thereof, it will be understood by those skilled in the art that various changes in detail may be made therein without departing from the spirit, scope, and teaching of the invention. For example, while the invention has been disclosed in the context of an optical disk library, similar consideration may make it equally applicable to other types of libraries. In addition, numerous variations in the libraries may be made, such as the number of drives and storage cells. For example, in an alternative embodiment, library 1 includes 32 storage cells 3 and two drives 4. System controller 17 is located external to housing 2, which is of reduced size. The remaining features of library 1 are essentially unchanged. Also, the usage frequency statistics may be based on parameters other than those described herein. Accordingly, the invention disclosed herein is to be limited only as specified in the following claims.

What is claimed is:

1. A method for maximizing storage media hit ratio in a machine-type media storage library, said library having a host processor connected thereto, said library having a plurality of physically individual media for storing data files thereon, said library having at least one machine-type access device for accessing files on media that is currently in said at least one access device, said at least one access device functioning as a first physical level of storage that is currently accessible by said host processor, and said library having a second physical level of media storage that is transferrable to said at least one access device, files stored in said first level being accessible directly by said host processor, and files stored in said second level being accessible by said host processor after a media containing files is physically transferred from said second level to said first level, the method comprising the machine-executed steps of:

physically transferring media from said second level to said first level;

electronically accessing files on media at said first level;

electronically tracking the number of physical accesses of each file at said first level;

electronically tracking the number of physical transfers of each media from said second level to said first level;

electronically determining frequently accessed files and frequently transferred media; and electronically migrating said frequently accessed files to said frequently transferred media.

2. The method of claim 1 wherein said first level has a media capacity of X media, and said frequently accessed files are migrated to no more than X frequently transferred media.

3. An automated machine-type media storage library connected to a host processor, said library Physically manipulating a plurality of media stored therein, each media including at least one data volume thereon, and each data volume including a plurality of data files, the library comprising:

a plurality of peripheral media access devices;

a plurality of physically separated storage cells, each storage cell being capable of storing one of said media therein;

machine-executed means for physically moving media between said access devices and said storage cells, said machine-executed means operating to physically mount media on said access devices as media is physically moved from said storage cells to said access devices;

each access device providing said host processor with access to data files in a data volume on media that is mounted in an access device;

electronic means for counting the number of times each data file is accessed by an access device and generating a data file access count;

electronic means for counting the number of times each media is physically mounted by said mounting means in an access device and generating a media mount count;

electronic means responsive to said data file access count for determining frequently accessed data files;

electronic means responsive to said media mount count for determining frequently mounted media; and electronic means for transferring said frequently accessed data files to said frequently mounted media.

4. The automated media storage library of claim 3 wherein said peripheral media access devices have a total mountable capacity of X media and said frequently accessed files are migrated to no more than X frequently mounted media.

5. The automated media storage library of claim 3 wherein said peripheral media access devices have a total mountable capacity of X media, and further comprising means for Physically mounting no more than X frequently mounted media upon initialization.

6. The automated media storage library of claim 8 further comprising means for designating specific files as being most frequently accessed files.

7. The automated media storage library of claim 8 further comprising:

means for physically demounting a frequently mounted media from an access device to permit the physical mounting of an infrequently mounted media on said access device;

a storage cell in close physical proximity to said access device from which said frequently mounted media was demounted;

said moving means physically moving said demounted frequently mounted media to said close proximity storage cell, whereby said frequently mounted media is stored in a cell from which it may be quickly moved back to said access device after access to said infrequently mounted media is completed.

* * * * *